United States Patent [19]
Kariya

[11] Patent Number: 5,774,803
[45] Date of Patent: Jun. 30, 1998

[54] MOBILE DEVICE AND REGIONAL INFORMATION SYSTEM

[75] Inventor: Kazuo Kariya, Kawasaki, Japan

[73] Assignee: Fujitsu Limited, Kawasaki, Japan

[21] Appl. No.: 661,010

[22] Filed: Jun. 10, 1996

[30] Foreign Application Priority Data

Jun. 8, 1995 [JP] Japan ..................................... 7-141473

[51] Int. Cl.$^6$ ...................................................... H04B 1/00
[52] U.S. Cl. ........................... 455/414; 455/412; 455/566
[58] Field of Search ..................................... 455/414, 412, 455/518–520, 566; 379/201

[56] References Cited

U.S. PATENT DOCUMENTS

| | | | |
|---|---|---|---|
| 4,131,849 | 12/1978 | Freeburg et al. | 455/517 X |
| 5,131,020 | 7/1992 | Liebesny et al. | 455/414 X |
| 5,321,737 | 6/1994 | Patsiokas | 455/414 |
| 5,577,103 | 11/1996 | Foti | 455/414 X |

*Primary Examiner*—Thomas J. Mullen, Jr.
*Attorney, Agent, or Firm*—Staas & Halsey

[57] ABSTRACT

A mobile device [1] receives a required piece of regional information. A regional information center [4] provides regional information. The mobile device [1], a base station [2], an exchange [3], and the regional information center [4] form a regional information system [that is capable of] providing regional information without traffic congestion. The center [4] has a headline table [5 for] storing the headlines of regional information, a reservation table [6 for] reserving time for providing requested information, and a database [7 for] storing regional information. The center [4] sends the headlines of regional information to the base station [2], which adds the headlines to general information and transmits the general information with the added headlines. The mobile device [1] receives the general information, extracts the headlines out of the general information, displays the headlines, and transmits an information request according to a specified piece of regional information. Upon receiving the request, the center [4] reserves time for providing the requested information and informs the mobile device [1] of the reserved time. When the reserved time occurs, the mobile device [1] calls the center [4], which provides the mobile device [1] with the requested information.

6 Claims, 3 Drawing Sheets

5,774,803

MOBILE DEVICE AND REGIONAL INFORMATION SYSTEM

BACKGROUND OF THE INVENTION

1. Field of the Invention

The present invention relates to a mobile device for receiving regional information, a regional information center, a regional information system, and a method of providing regional information.

The mobile device is used to receive various pieces of regional information about traffic, maps, commodities in shops and department stores, events, etc., in a zone where the mobile device is present. Such regional information must be provided without interfering with ordinary communication.

2. Description of the Related Art

An information system 1, such as a traffic information system using radio broadcasting, provides information for the public; however, it has no means to allow the users to pick up a necessary piece of information. A commodity information system in, for example, a department store employs terminals distributed in the store and allows the users to pick up a required piece of information. This system, however, is useful only at the locations of the terminals.

Another information system allocates special numbers to regional information pieces, respectively. The user dials from a telephone or terminal the number of the necessary information to get it. This system is useful when used with terminals installed in a region that provides information but is inconvenient for mobile devices such as cellular phones and automobile phones because they are carried through different regions.

A regional information system applicable to mobile communication is disclosed in Japanese Unexamined Patent Publication No. 2-262732. This disclosure allocates regional information providing units and zone numbers to base stations, respectively. A mobile device sends an information request with a zone number, and the base station having the zone number provides the mobile device with the requested information.

Another regional information system is disclosed in Japanese Unexamined Patent Publication No. 6-245254. The user of a mobile device pushes a request button and a genre button to retrieve necessary regional information from a database of a base station.

According to the former disclosure, the mobile device may receive regional information from the base station without using a circuit to an exchange. There is a risk, however, that too many mobile devices simultaneously send information requests, congesting speech channels, because the requested information pieces are provided through the speech channels. This results in interfering with ordinary calls.

SUMMARY OF THE INVENTION

An object of the present invention is to control regional information, provided to mobile devices, and to avoid the congestion of communication channels.

FIG. 1 shows a regional information system according to the present invention.

Each mobile device 1 has a transceiver, a codec, an operation panel, a display, a voice/data I/O unit, and a controller. The mobile device 1 also has an extractor for extracting the headlines of regional information out of general information received by the transceiver. The general information is radioed into a zone where the mobile device is present. The mobile device 1 further has a memory for storing the extracted headlines. The controller displays the stored headlines on the display, receives, through the control panel, an instruction to specify a piece of regional information, transmits a request to a regional information center to provide the specified information, receives, from the regional information center, a notice of time reserved for providing the requested information, and calls the regional information center when the reserved time comes.

If any one of the extracted headlines has group information, the controller stores the headline in the memory only when the mobile device belongs to a group specified by the group information.

The regional information center 4 has a database 7 for storing regional information, a headline table 5 for registering the headlines of the regional information stored in the database 7, a reservation table 6 for registering time reserved for each piece of regional information according to information requests, and a manager for determining whether or not a given information request must be registered in the reservation table 6 according to the number of information pieces allowed simultaneously per time band, giving a response to the information request, and retrieving a requested piece of regional information from the database 7 when the reserved time comes.

The regional information system has at least the regional information center 4, a base station 2, and a mobile device 1. The regional information center 4 has at least the database 7 for storing regional information, the headline table 5 for registering the headlines of the regional information stored in the database 7, and the reservation table 6 for registering time reserved for each piece of regional information according to information requests. The base station 2 is connected to the regional information center 4 through an exchange 3, adds the headlines of regional information to general information, and transmits the general information. The mobile device 1 has the functions of receiving the general information from the base station 2, extracting the headlines out of the general information, displaying the headlines, sending an information request according to a specified one of the headlines, and requesting the regional information center 4 to send the specified regional information when time reserved by the regional information center 4 comes (i.e., arrives).

A method of providing regional information involves a regional information center 4, a base station 2 connected to the regional information center 4 through an exchange 3, and a mobile device 1 for communicating with the regional information center 4 through the base station 2. The method transmits, from the base station 2, general information with the zone number of the base station 2 and the headlines of regional information. According to the method, the mobile device 1 receives the general information, extracts the headlines out of the general information, displays the headlines, and sends an information request according to a specified one of the headlines, the information request including a regional information number, a mobile device number, and a zone number. According to the method, the regional information center 4 receives the information request, determines a time band to provide the requested regional information, and informs the mobile device of the time band thus informed, or reported, to the mobile device. In the informed time band, the mobile device calls the regional information center 4, which provides the mobile device with the requested regional information.

Upon receiving the information request from the mobile device, the regional information center 4 checks the reservation state of the requested information to determine whether or not the requested information is servable. If it is servable(i.e., available for being provided to the requesting mobile device), the center 4 reserves the time of providing the requested information and informs the mobile device of the reserved time.

The mobile device 1 receives general information from the base station 2 with the headlines of regional information that are periodically added to the general information, extracts the headlines, stores the headlines in the memory, and displays the headlines on the display. If the capacity of the display is large, it displays a plurality of headlines with representative numbers. If the capacity of the display is small, it displays a required one of the headlines by scrolling. The representative number of each headline is used when making an information request for the corresponding regional information. Upon receiving an information request from the mobile device, the regional information center 4 sets the time of providing the requested information and informs the mobile device of the time. When the time comes, the mobile device 1 calls the regional information center 4. This arrangement avoids the congestion of calls requesting for regional information, and the mobile device may smoothly receive regional information.

Any one of the headlines of regional information may have the name of a group of contractors that are allowed to access the regional information. In this case, the controller of the mobile device 1 determines whether or not the mobile device belongs to the group. Only when the mobile device belongs to the group, does the controller store the headline in the memory and displays it on the display. Namely, only a mobile terminal belonging to the group can receive the regional information.

The manager 8 of the regional information center 4 stores, in the database 7, regional information such as commodity information and traffic information provided by providers. Whenever any provider updates its information, the related information stored in the database 7 is updated. The center 4 may have an automatic editing function to prepare the headlines of the regional information stored in the database 7. The headlines may be entered through a terminal device of the center 4. These headlines are registered in the headline table 5. The center 4 has a scheduling function to reserve the time of providing regional information according to an information request made by the mobile device. The reserved time is registered in the reservation table 6 and is informed (i.e., reported) to the mobile device. When the time comes, the mobile device requests the regional information, and the center 4 retrieves the information from the database 7 and transfers it to the mobile device.

In the regional information system consisting of the mobile device 1, base station 2, exchange 3, and regional information center 4, the headlines stored in the headline table 5 of the center 4 are sent to the base station 2 through the exchange 3. The base station 2 transmits the headlines with general information. Any mobile device 1 that is present in the zone of the base station 2 is able to receive the general information. The mobile device 1 extracts the headlines out of the general information, displays the headlines, and prepares an information request according to a specified one of the headlines. Upon receiving the information request, the center 4 checks the reservation table 6 to determine whether or not it is possible to reserve the time of providing the requested information, and informs the mobile device of the result. If the time is reserved, it is informed(i.e., reported)to the mobile device. When the time comes, the mobile device calls the center 4, which retrieves the requested regional information from the data base 7 and transfers it to the mobile device 1.

The method of providing regional information sends the headlines registered in the headline table 5 of the regional information center 4 to the base station 2 through the exchange 3. The base station 2 transmits general information with the headlines. The mobile device 1 receives the general information, extracts the headlines out of the general information, displays the headlines, and sends an information request according to a specified one of the headlines, the information request including a regional information number, a mobile device number, and a zone number. Upon receiving the information request, the center 4 checks the reservation table 6 to determine whether or not it is possible to reserve the time of providing the requested information. If it is possible, the time is reserved in the reservation table 6 and is informed (i.e., reported) to the mobile device 1. When the time comes, the mobile device 1 calls the center 4, which retrieves the requested regional information from the database 7 and transfers it to the mobile device 1.

The regional information center 4 fixes the number of information pieces to be provided per time band without interfering ordinary calls. If the number of reservations in a given time band exceeds the fixed number, no more reservations are accepted in the time band, and it is checked to see whether or not any other time band has room for accepting the information request. If another time band is available, the time band is reserved and informed to (i.e., reported) the mobile device.

BRIEF DESCRIPTION OF THE DRAWINGS

The present invention will be more clearly understood from the description as set forth below with reference to the accompanying drawings, in which.

DESCRIPTION OF THE PREFERRED EMBODIMENTS

Figure 1:
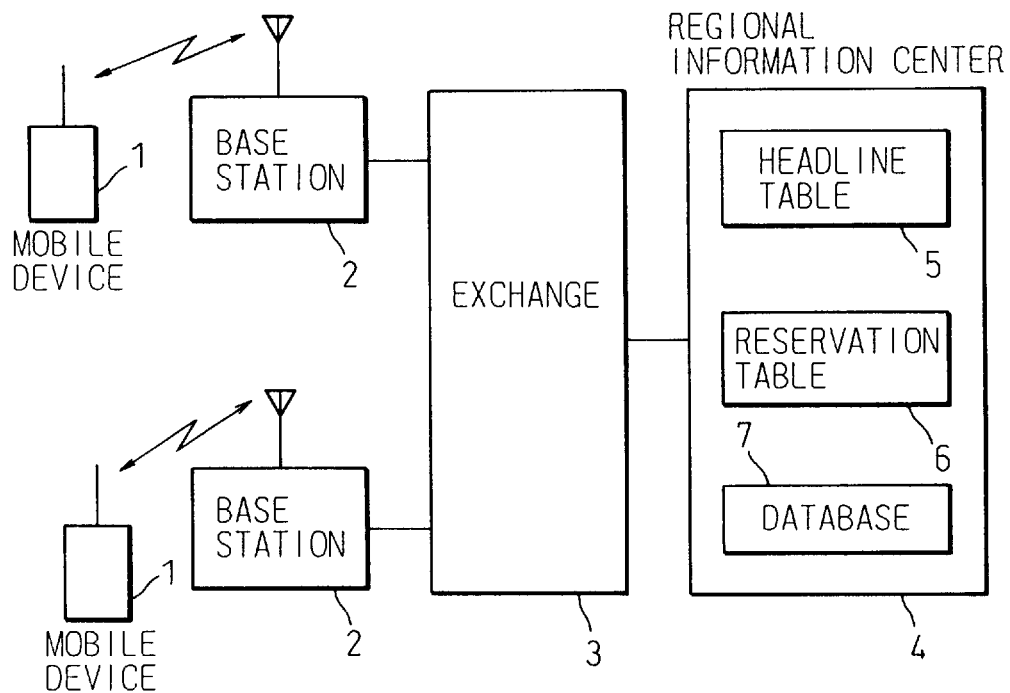
FIG. 1 shows a regional information system according to an embodiment of the present invention.

FIG. 1 shows a regional information system according to an embodiment of the present invention. The system includes mobile devices 1, base stations 2, an exchange 3, and a regional information center 4. The center 4 has a headline table 5 for registering the headlines of regional information, a reservation table 6 for managing the time of providing requested regional information, and a database 7 for storing regional information. The exchange 3 includes a control station which centrally manages the base stations 2 and connections among the base stations 2 and subscribers. Although there is only one center 4 in the embodiment, it may be arranged for each regional group.

Each base station 2 receives the headlines of regional information from the regional information center 4, adds the headlines, a zone number allocated to the base station, etc., to general information, and transmits the general information to the mobile devices 1 that are in the zone of the base station 2. These functions are easily realized with a small number of parts.

The general information with the headlines transmitted by the substation 2 is received simultaneously by all mobile devices 1 that are present in the zone of the base station 2.

The database 7 of the regional information center 4 stores character and image regional information about traffic, maps, commodities of shops and department stores, samples of commodities, and events. The headline table 5 registers the headlines of the regional information stored in the database 7. The headlines are transmitted to the corresponding base stations 2 regularly or whenever the information is updated. Each base station 2 adds the headlines to general information and radios the general information.

Figure 2:
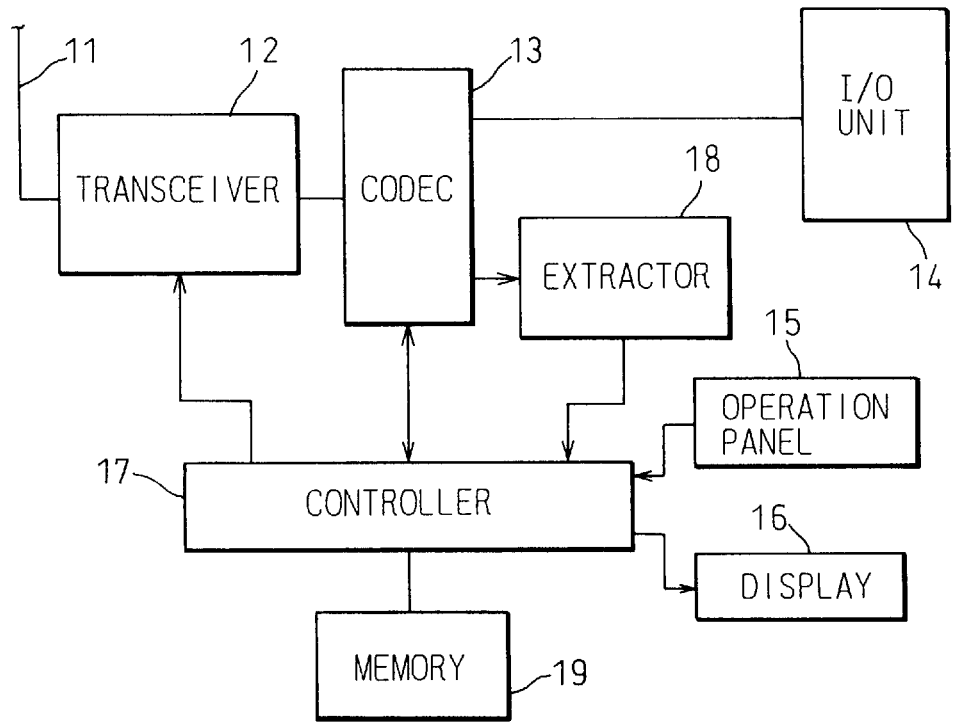
FIG. 2 shows essential parts of a mobile device of the system of FIG. 1.

FIG. 2 shows essential parts of the mobile device 1 according to the embodiment of the present invention. The mobile device 1 has an antenna 11, a transceiver 12, a codec 13, a voice/data I/O unit 14, an operation panel 15 including dial keys, a display 16 such as a liquid crystal display, a controller 17, an extractor 18 for extracting headlines, and a random access memory (RAM) 19.

The transceiver 12 receives the general information with the headlines from the base station 2 through the antenna 11. The codec 13 decodes the received information, and the extractor 18 extracts the headlines out of the decoded information. The controller 17 stores the headlines in the memory 19 and displays the headlines on the display 16.

If the capacity of the display 16 allows, a plurality of the headlines are displayed with numbers. If the number of headlines is greater than the capacity of the display 16, the operation panel 15 is manipulated to scroll the headlines on the display 16.

When any one of the displayed headlines is selected through the operation panel 15 with the number allocated to the headline, the controller 17 prepares an information request with a zone number, mobile device number, and headline number and transmits the request with call information to the regional information center 4.

Figure 3:
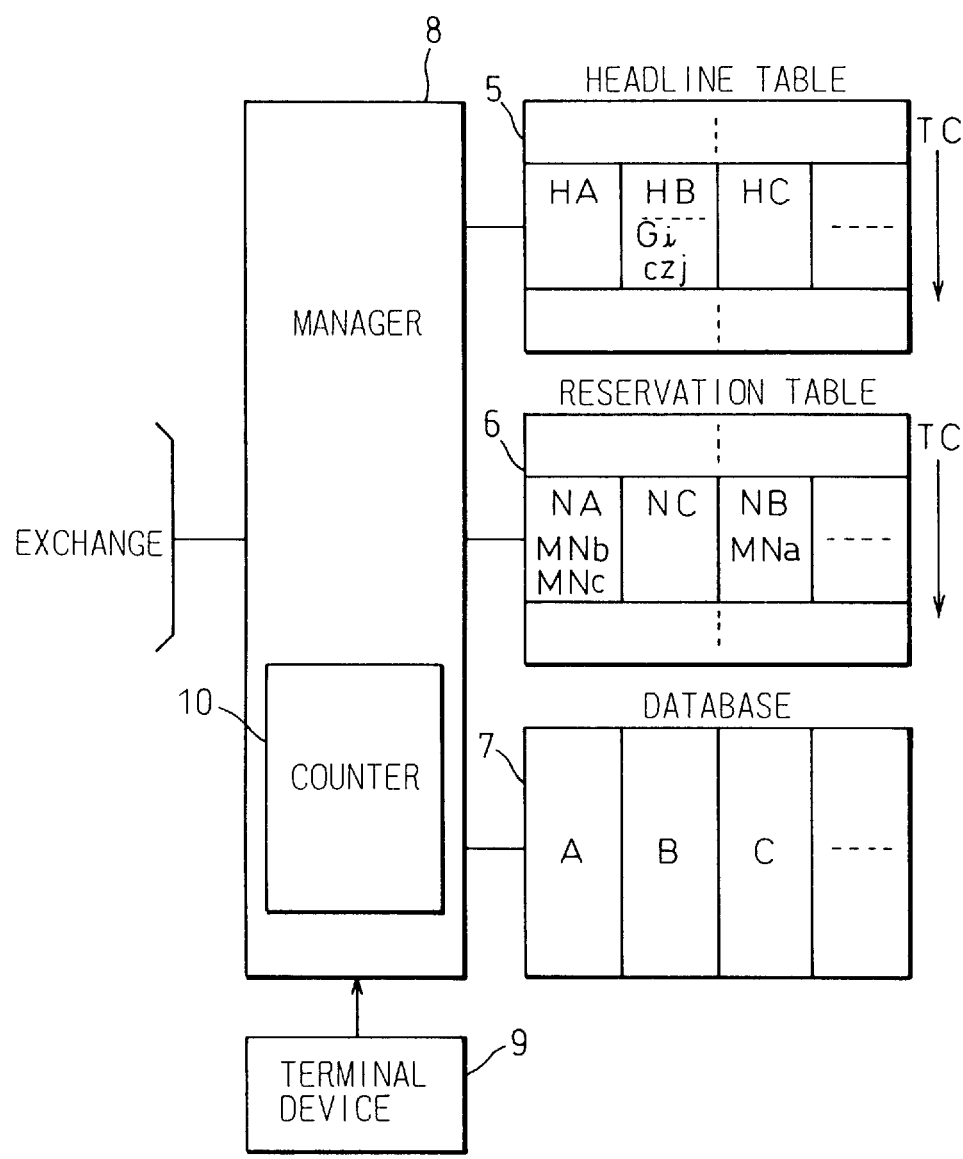
FIG. 3 shows essential parts of a regional information center of the system of FIG. 1.

FIG. 3 shows essential parts of the regional information center 4 of the embodiment. The center 4 has the headline table 5, the reservation table 6, the database 7, a manager 8, a terminal device 9, and a counter 10. The database 7 stores regional information of providers with servicing conditions such as group names and region names. The terminal device 9 may be used to enter the regional information and servicing conditions, which are stored in the database 7 through the manager 8. The regional information and servicing conditions may be transferred from the exchange 3 and are stored in the database 7 through the manager 8.

The headlines HA, HB, HC, and the like of regional information pieces A, B, C, and the like stored in the database 7 are entered through the terminal device 9 or are automatically edited by the manager 8. These headlines are stored in the headline table 5. For the headline HB, servicing conditions, i.e., a group number Gi and a zone number czi are also stored.

The headlines are repeatedly transmitted to the corresponding base stations 2 at regular intervals. When the regional information pieces are updated, the corresponding headlines are updated and transmitted to the base stations 2. According to the counter 10, the manager 8 regularly reads the headlines out of the headline table 5 and transmits them to the corresponding base stations 2.

The reservation table 6 registers time reserved for an information request. Areas of the table 6 store regional information numbers and corresponding mobile device numbers, and the table 6 is accessed according to the counter 10. In FIG. 3, a regional information number NA is reserved for the mobile devices MNb and MNc in a given time band, a regional information number NB is reserved for the mobile device number MNa in the same time band, and a regional information number NC is reserved for no mobile device in the time band.

The manager 8 has a scheduling function to control the reservation table 6. The number of information pieces to be provided per time band is determined not to interfere with ordinary calls, according to the number of information pieces the regional information center 4 can simultaneously provide per time band and by the number of information pieces each base station can provide in the total number of calls the base station can bear. Any information request exceeding the predetermined number of information pieces in a given time band is reserved for another time band having room for it.

Figure 4:
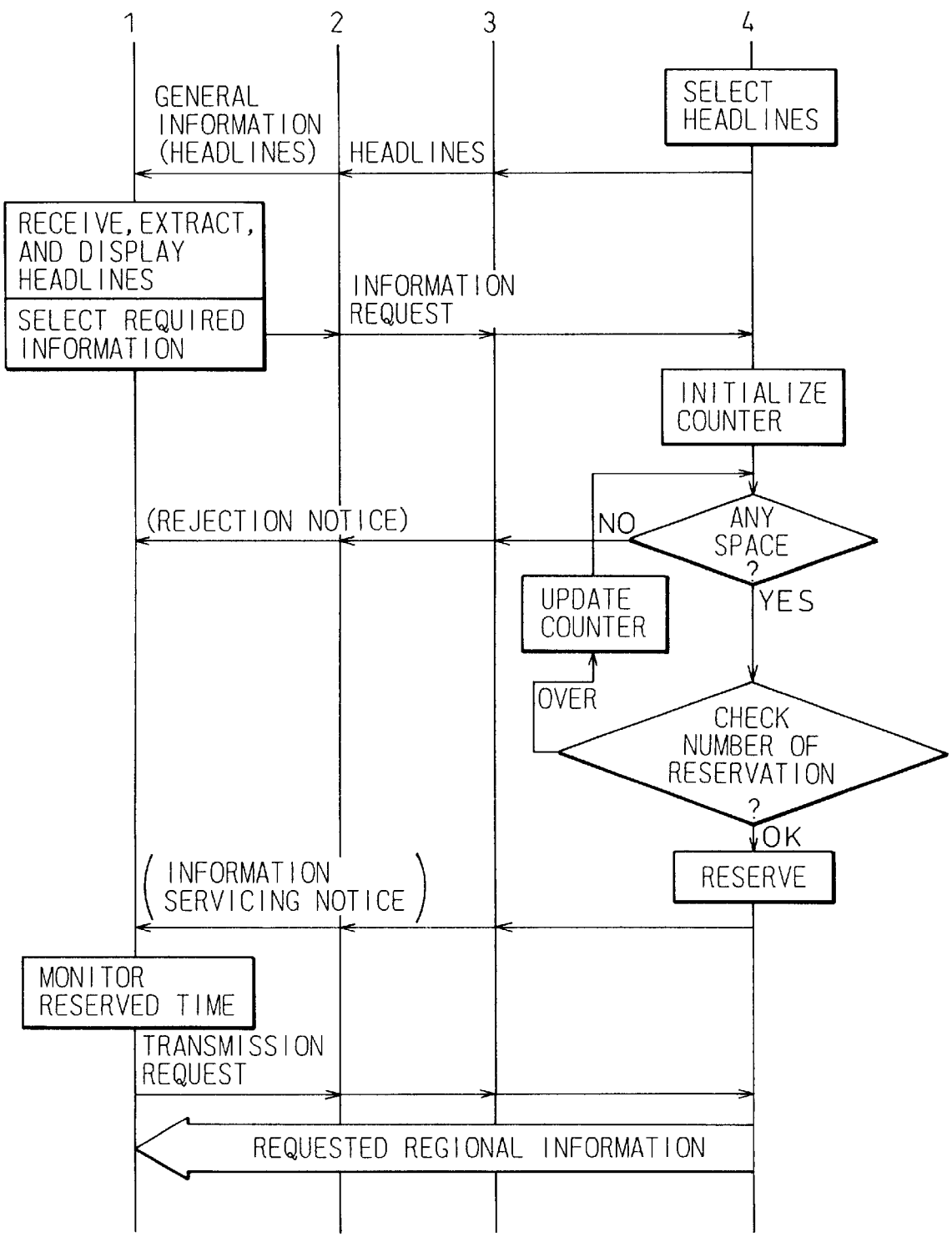
FIG. 4 shows a regional information providing sequence according to the embodiment.

FIG. 4 shows a regional information providing sequence according to the embodiment of the present invention. The regional information center 4 selects headlines region by region. Namely, the manager 8 of the center 4 reads a group of headlines HA, HB, HC, etc., out of the headline table 5 according to the counter 10 and transmits them to a corresponding one of the base stations 2 through the exchange 3. If any headline has a zone number czj, it is transmitted only to the base station that has the zone number czj.

The base station 2 adds the transmitted headlines to general information and transmits it. Upon receiving the general information, the extractor 18 of the mobile device 1 extracts the headlines out of the general information. The headlines are stored in the memory 19 and are displayed on the display 16. If any headline has a specific group name Gi, the controller 17 determines whether or not the mobile device 1 belongs to the group. Only when it belongs to the group, the headline in question is stored in the memory 19 and is displayed on the display 16.

The user of the mobile device 1 selects any one of the numbers allocated to the displayed headlines. The controller 17 prepares an information request containing the information number, a mobile device number, and a zone number and sends the request to the regional information center 4. The information request may be included in the user-to-user information of a call setting message so that the request is transmitted without setting a separate speech channel between the mobile device 1 and the center 4.

Upon receiving the information request, the regional information center 4 uses the scheduling function. Namely, the center 4 initializes the counter 10 to the present time and determines whether or not the reservation table 6 has a space. If it has no space, a rejection notice is sent to the mobile device. If the reservation table 6 has a space, the number of reservations for a time band corresponding to the counter 10 is checked. Namely, it is determined whether or not the number of reservations for the time band is above the limit of the center 4 or the limit of the base station.

If the number of reservations is below the limits, the information number, mobile device number, and zone number are registered in the reservation table 6. An information servicing notice with the reserved time is transmitted to the mobile device that made the information request. The information servicing notice may be added to the user-to-user information of a response message that is returned in response to the call setting message. If the number of reservations is equal to the limits, the counter 10 is incremented, and the number of reservations for a time band corresponding to the counter 10 is checked. Even if a given time band is fully reserved, the next time band may have a space. In this case, the time band having a space is reserved and registered in the reservation table 6.

Upon receiving the information servicing notice from the regional information center 4, the controller 17 of the mobile device 1 sets the reserved time contained in the notice in a counter, starts to monitor the counter, and if the reserved time comes, requests the center 4 to send the necessary regional information. A communication path is established between the mobile device 1 and the center 4 through the exchange 3 and base station 2. The center 4 retrieves the regional information from the database 7 according to the reservation data stored in the reservation table 6 and transmits the retrieved information to the mobile device 1.

The regional information provided by the regional information center 4 may be multimedia information including voice, characters, and images. The voice information is heard through a speaker of the I/O unit 14. The characters are displayed on the display 16. If there is facsimile information, it is printed by a facsimile device (not shown). The images are displayed on the display 16 or on an image display (not shown). Not only still pictures but also moving pictures can be handled by the regional information system. The moving pictures are compressed and coded according to, for example, MPEG2 (Moving Picture Experts Group 2) and are transmitted. In this case, the mobile device 1 is provided with a decoder to decode the moving pictures, which are displayed on the display 16.

If the reserved time informed (i.e., reported) with the information servicing notice from the regional information center 4 is too late, the user may enter a cancellation instruction through the operation panel 15 to stop monitoring the reserved time. The reserved time may be displayed on the display 16, so that the user may manually call the center 4 to ask for the requested regional information. The customers of a department store or the members of a theater may form a group, and a group number is allocated to the group. The group number is set in corresponding mobile devices. Only when the group number set in the mobile device agrees with a group number added to a headline, does the mobile device store the headline in the memory 19 and display it on the display 16.

As explained above, the present invention adds headlines sent from the regional information center 4 to general information to be transmitted from the base station 2, so that each mobile device 1 in the zone of the base station 2 may receive the general information with the headlines and a zone number, without extra channels.

The mobile device 1 extracts the headlines and displays them on the display 16 so that the user may identify regional information provided by the center 4 and easily select a required piece of information. The headlines are stored in the memory 19 and are displayed on the display 16 as and when needed so that the user may select and request information in a region where the mobile device 1 is present. It is possible to provide regional information only for a group of contractors who have made a contract with the provider of the information. For example, special prices of commodities may be informed only to special customers.

The present invention determines, in advance, the number of information pieces the regional information center 4 can provide per time band as well as the number of information pieces each base station can provide per time band. The manager 8 of the center 4 uses the reservation table 6 to schedule the timing of providing regional information. When a given mobile device generates an information request, the manager 8 reserves time to provide requested regional information and notifies (i.e., reports) the time to the mobile device. This prevents the congestion of communication channels or an interference with ordinary calls when providing the mobile device with the requested regional information.

The database 7 of the regional information center 4 serves for a plurality of base stations 2, to reduce the cost of the regional information system and simplify the management thereof.

What is claimed is:

1. A mobile device, comprising:

a transceiver, a codec, an operation panel, a display and a voice/data input/output unit;

an extractor extracting the headlines of regional information out of general information received by the transceiver, the general information being transmitted in a zone where the mobile device is present;

a memory storing the extracted headlines; and a controller displaying the stored headlines on the display, receiving, through the operation panel, an instruction to specify a piece of regional information, transmitting a request to a regional information center to provide the specified piece of regional information, receiving, from the regional information center, notice of a time which is reserved for providing the requested information and calling the regional information center at the reserved time to receive the requested information from the regional information center.

2. The mobile device as claimed in claim 1, wherein, for each extracted headline having group information, the controller stores the headline in the memory only when the mobile device belongs to a group specified by the group information.

3. A regional information center comprising:

a database storing regional information;

a headline table registering the headlines of the regional information stored in the database;

a reservation table registering a time which is reserved for each piece of regional information according to an information request thereof; and a managing unit determining wether or not a given information request must be registered in the reservation table according to the number of information pieces allowed simultaneously per time band, providing a response to the information request and retrieving a requested piece of regional information from the database at the reserved time.

4. A regional information system comprising:

a regional information center having a database storing regional information, a headline table registering the headlines of the regional information stored in the database and a reservation table registering time reserved for each piece of regional information according to information requests;

a base station, connected to the regional information center through an exchange, adding the headlines of regional information to general information and transmitting the general information with the added headlines; and a mobile device receiving the general information transmitted from the base station, extracting the headlines from the received general information, displaying the extracted headlines, sending an information request according to a specified one of the headliners and requesting the regional information center to send the specified regional information at the reserved time.

5. A method of providing regional information in a regional information system having at least a regional information center, a base station connected to the regional information center through an exchange and a mobile device communicating with the regional information center through the base station, comprising the steps of:

- transmitting, from the base station, general information with the zone number of the base station and the headlines of regional information;
- letting the mobile device receive the general information, extract the headlines out of the general information, display the headlines and send an information request according to a specified one of the headlines, the information request including a regional information number, a mobile device number, and a zone number;
- letting the regional information center receive the information request, reserve a time band to provide the requested regional information and inform the mobile device of the reserved time band;
- letting the mobile device call the regional information center in the reserved time band to request the regional information; and
- letting the regional information center provide the mobile device with the requested regional information.

6. The method as claimed in claim 5, further comprising, after the mobile device makes an information request, the step of letting the regional information center check the reservation state of the requested information, determined whether or not the requested information is servable, reserve the time band of providing the requested information, if it is servable, and inform the mobile device of the reserved time band.

\* \* \* \* \*

UNITED STATES PATENT AND TRADEMARK OFFICE
CERTIFICATE OF CORRECTION

PATENT NO. : 5,774,803  
DATED : June 30, 1998  
INVENTOR(S) : Kazuo KARIYA

Page 1 of 2

It is certified that error appears in the above-identified patent and that said Letters Patent is hereby corrected as shown below:

Title Page, Abstract, line 1, delete "[1]";
line 2, delete "[4]";
line 3, delete "[1]";
line 4, delete each of "[2]", "[3]" and "[4]";
line 5, delete "that is capable of";
line 7, delete "[4]" and delete "[5 for]";
line 8, delete "[6 for]";
line 10, delete "[7 for]" and delete "[4]";
line 12, delete "[2]";
line 14, delete "[1]";
line 18, delete "[4]";
line 20, delete "[1]";
line 21, delete "[1]";
line 22, delete "[4]" and delete "[1]".

Col. 1, line 18, delete "[1]".

Col. 2, line 39, after "information," insert --and transmits the general information--;
line 40, delete "and transmits the general information";
line 66, delete "thus informed, or reported, to the mobile device";
line 67, after "band," insert --thus informed, or reported, to the mobile device--.

Col. 3, line 6, after "servable" insert --(i.e., available for being provided to the requesting mobile device)--;
lines 7-8, delete "(i.e., available for being provided to the requesting mobile device)--.

Col. 4, line 33, delete "to" and after "(i.e., reported)" insert --to--.

UNITED STATES PATENT AND TRADEMARK OFFICE
CERTIFICATE OF CORRECTION

PATENT NO. : 5,774,803
DATED : June 30, 1998
INVENTOR(S) : Kazuo KARIYA

It is certified that error appears in the above-identified patent and that said Letters Patent is hereby corrected as shown below:

Col. 9, line 2, change "headliners" to --headlines--.

Signed and Sealed this

Twenty-fourth Day of November, 1998

Attest:

BRUCE LEHMAN

Attesting Officer

Commissioner of Patents and Trademarks